(12) United States Patent
Bangert et al.

(10) Patent No.: US 11,473,845 B2
(45) Date of Patent: Oct. 18, 2022

(54) CRIMPING FRAME OR CRIMPING BASE

(71) Applicant: Mahle International GmbH, Stuttgart (DE)

(72) Inventors: Boris Bangert, Heimsheim (DE); Marc Bohnhorst, Ebersbach (DE); Nicolas Ferrand, Stuttgart (DE); Bernd Hoffmann, Vaihingen/Enz (DE); Chi-Duc Nguyen, Stuttgart (DE); Markus Schmid, Wernau (DE); Ulli Schneller, Renningen (DE)

(73) Assignee: Mahle International GmbH

( * ) Notice: Subject to any disclaimer, the term of this patent is extended or adjusted under 35 U.S.C. 154(b) by 161 days.

(21) Appl. No.: 16/930,294

(22) Filed: Jul. 15, 2020

(65) Prior Publication Data
US 2021/0018271 A1   Jan. 21, 2021

(30) Foreign Application Priority Data

Jul. 16, 2019   (DE) .................... 10 2019 210 477.0

(51) Int. Cl.
*F28D 9/00* (2006.01)
*F28F 9/02* (2006.01)

(52) U.S. Cl.
CPC .......... *F28D 9/0043* (2013.01); *F28F 9/0224* (2013.01); *F28F 2275/08* (2013.01); *F28F 2275/122* (2013.01)

(58) Field of Classification Search
CPC ... F28D 9/0043; F28F 9/0224; F28F 2275/08; F28F 2275/122
See application file for complete search history.

(56) References Cited

U.S. PATENT DOCUMENTS

| | | | | |
|---|---|---|---|---|
| 5,195,579 A | * | 3/1993 | Buchanan | F28F 9/0224 165/149 |
| 5,758,721 A | * | 6/1998 | Letrange | F28F 9/0226 165/149 |
| 7,341,098 B2 | * | 3/2008 | Brost | F28F 9/0224 165/149 |
| 9,239,196 B2 | * | 1/2016 | Ghiani | F28F 9/0226 |
| 9,772,144 B2 | * | 9/2017 | Day | F28F 9/027 |
| 11,073,345 B2 | * | 7/2021 | Dziubinschi | F28F 9/0226 |
| 2006/0185833 A1 | * | 8/2006 | Brost | F28D 1/05366 165/149 |
| 2010/0282449 A1 | * | 11/2010 | Merklein | F28F 9/0226 165/173 |
| 2012/0018135 A1 | * | 1/2012 | Ciaffarafa | F28F 9/0226 165/173 |

FOREIGN PATENT DOCUMENTS

DE   10 2009 009 807 A1   8/2010

OTHER PUBLICATIONS

English abstract for DE-10 2009 009 807.

* cited by examiner

*Primary Examiner* — Devon Russell
(74) *Attorney, Agent, or Firm* — Fishman Stewart PLLC

(57) ABSTRACT

A crimping frame or crimping base for a charge air cooler may include a circumferential raised rim including a plurality of crimping slots. The plurality of crimping slots may each include two longitudinal sides and two narrow sides. The two longitudinal sides may be disposed opposite one another and may extend parallel to the rim. The two narrow sides may be stiffened via a bent reinforcement. The bent reinforcement and the rim may be structured as a single piece.

20 Claims, 4 Drawing Sheets

CRIMPING FRAME OR CRIMPING BASE

CROSS-REFERENCE TO RELATED APPLICATIONS

This application claims priority to German Patent Application No. DE 10 2019 210 477.0, filed on Jul. 16, 2019, the contents of which is hereby incorporated by reference in its entirety.

TECHNICAL FIELD

The present invention relates to a crimping frame or a crimping base for a charge air cooler. In addition, the invention relates to a charge air cooler having a heat exchanger block with flat tubes which in each case are received in through-openings of associated tube plates and having a crimping frame or a crimping base formed as tube plate.

BACKGROUND

In order to be able to increase the performance of modern internal combustion engines, a so-called charge air cooler is often employed, with which compressed and cooled charge air is fed to the internal combustion engine. Such charge air coolers usually consist of a metallic heat exchanger block, in particular formed of aluminium and collection tanks or air boxes or flanges that are produced from plastic. For connecting these air boxes or generally these plastic boxes, these are fixed to the heat exchanger block by means of a so-called crimp connection via a crimping frame or a crimping base.

Through the increasing desire for further increased performance, the high charge air alternating pressure loads occurring in the charge air coolers likewise become greater, which in the long term can result in a loosening of the crimp connection, in particular on the longitudinal sides of the collection tanks and thus in leakages on the charge air side. Here, in particular corner regions in the crimping slots are subjected to particularly high loads as a result of which stress peaks can occur in an upper corner region, adjacent to a free edge of the crimping frame or crimping base, in particular in the narrow sides, which are ultimately responsible for the failure of the crimp connection because of the dynamic pressure changes in particular also because of pressure pulsations of the charge air.

SUMMARY

The present invention therefore deals with the problem of stating an improved embodiment for a crimping frame or a crimping base which is characterized in particular by an increased strength and thus a longer lifespan.

According to the invention, this problem is solved through the subject matter of the independent claim(s). Advantageous embodiments are the subject matter of the dependent claim(s).

The present invention is based on the general idea of reinforcing a crimp connection at its locations that are particularly stress-loaded in a comparatively simple manner and by way of this configure the crimp connection as a whole to have a longer lifespan. Such a crimp connection occurs for example with a crimping frame or a crimping base, for example a tube plate of a charge air cooler, which comprises a circumferentially raised rim with crimping slots. These crimping slots have two longitudinal sides located opposite and running parallel to the raised rim and two narrow sides, wherein the narrow sides of these crimping slots are reinforced or stiffened by way of a reinforcement formed and bent in one piece with the rim. In the region of the narrow sides, the crimping slots are thus reinforced by a material doubling. Through this material doubling, a region exposed in particular to high stress peaks, namely a corner region between a narrow side and a longitudinal side located adjacent to the free edge can be stiffened as a result of which the regions subjected to particularly high loads are reinforced and because of this altogether the capability of withstanding stress of the crimping frame or crimping base, even during pressure pulsations, can be improved.

In an advantageous further development of the solution according to the invention, the crimping frame or crimping base is formed as an unshaped punched metal part. Thus, the crimping frame or crimping base is punched out in one piece with the rim later on and also in one piece with the reinforcement arranged thereon, wherein in a forming process following the punching both the rim is raised and also the reinforcement bent. By way of this, the reinforcement of the rim and thus of the crimp connection is producible comparatively easily in terms of production engineering, quickly and cost-effectively.

In a further advantageous embodiment of the solution according to the invention, the bent reinforcement is connected to the rim, in particular soldered. In order to be able to produce a fixed connection between the reinforcement and the rim, in particular in the region of the narrow sides of the crimping slots, a preferentially integrally bonded connection is selected, wherein here the soldering in particular has proved to be advantageous. The reinforcement with the rim can precede a soldering process of a heat exchanger block or, provided that the crimping frame or the crimping base is part of the heat exchanger block, be carried out together with the same, i.e. for example the flat tubes and the crimping bases formed as tube plates.

Practically, exclusively the narrow sides of the crimping slots are stiffened by a reinforcement that is formed and bent in one piece with the rim. This offers the major advantage that in fact only those regions are exclusively reinforced which, in the operational state, in fact have to absorb the increased loads or peak loads. By way of this, a reduction of the use of resources and also a reduction of the weight can be achieved since the reinforcement is exclusively limited to local regions and not a continuous, complete rim is doubled through a likewise continuous, complete reinforcement with respect to the material.

Practically, the reinforcement overlaps the narrow sides by approximately 0.5-2 mm. Through the overlapping of the narrow sides by the reinforcement, in particular a free web of the respective crimping slots, which during the production of the crimp connection is formed out of the plane of the reinforcement by a rim, for example of a collection tank, can be stiffened. Through the mentioned overlap it is thus possible to reinforce exactly that region in which during the production of the crimp connection and during the operation later on the stress peaks occur.

Practically, the crimping base is formed as a tube plate of a charge air cooler. Such a tube base usually has passage openings in which flat tubes are sealingly received. Such a tube base likewise has a raised rim which is then crimped via a crimp connection to a collection tank, for example a diffuser or an air box, in that webs of crimping slots located outside are shaped out of a plane and engage behind one of the collection tank or air box. By way of such a crimping base according to the invention, which is inserted as tube base into a charge air cooler, high charge pressures and the pressure pulsations connected with this can in particular be better absorbed, as a result of which the danger of the disconnection of the crimp connection, compared with crimp connection that are not reinforced to date, can be significantly reduced.

The present invention, furthermore, is based on the general idea of stating a charge air cooler, having a heat exchanger block with flat tubes, which are received in each case on the longitudinal end side in through openings, for example passages, of associated tube plates. Such charge air coolers have at least one, usually two, collection tanks and a crimping frame or a crimping base formed as tube plate with a circumferential and raised rim with crimping slots, which have two longitudinal sides located opposite and running parallel to the rim and two narrow sides. The narrow sides of these crimping slots are stiffened by reinforcements formed and bent in one piece with the rim and usually also firmly connected to the rim, for example soldered. Here, the crimping frame or the crimping base is crimped to a rim of the collection tank in that webs of the crimping slots located outside are shaped out of their plane and in the process engage behind the rim of the collection tank. Through the reinforcement in the region of the narrow sides of the crimping slots it is possible to significantly better absorb high stresses or stress peaks that occur there both during the crimping and also during the operation of the charge air cooler later on, as a result of which the capability of withstanding stress and thus indirectly also the lifespan of the charge air cooler according to the invention can be increased.

Practically, the bent reinforcement is connected, in particular soldered to the rim of the crimping base or of the crimping frame. By way of this, an integrally bonded and extremely strong connection between the reinforcement and the narrow sides of the crimping slots can be achieved, as a result of which these places that are particularly subjected to stress can be stiffened. The reinforcement can overlap the narrow sides of the crimping slot by approximately 0.5-2 mm and by way of this stiffen the transition between the longitudinal side located outside and the narrow side, that is the corner region, which during the producing of the crimp connection is subjected to severe deformation. Through the local stiffening of the crimping frame or crimping base, a stiffening on the rim of the collection tank can also be omitted. A major advantage in addition is that current manufacturing processes for producing the crimp connection can be maintained since the change in terms of the reinforcement of the narrow sides of the crimping slots does not have any effects on the joining process or the producing of the crimp connection.

Generally, the reinforcement provided according to the invention can be employed in the region of the narrow sides of the crimping slots independently of the form of the crimping slots proper, so that both crimping slots can be stiffened with a continuous web arranged on the outside and also with an interrupted web.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows, in each case schematically.

DETAILED DESCRIPTION

Figure 1:
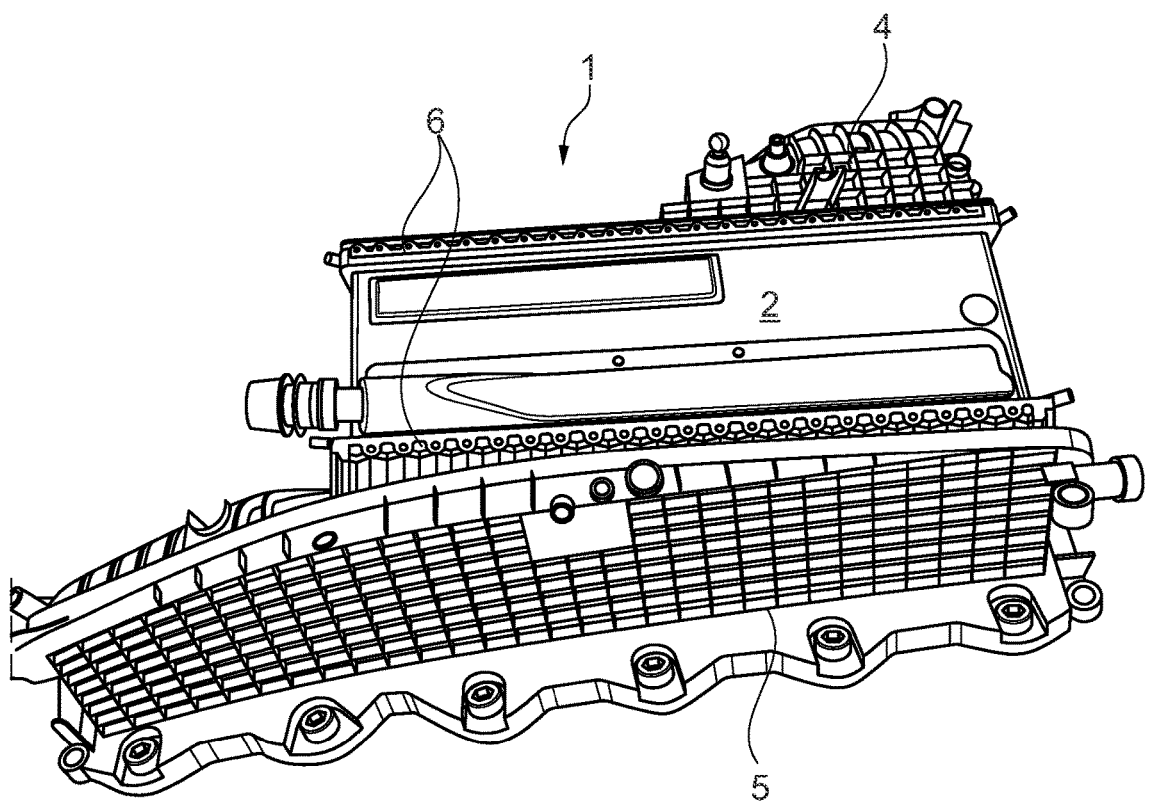
FIG. 1 shows a charge air cooler according to the invention with a crimping base according to the invention.

According to FIG. 1, a charge air cooler 1 according to the invention comprises a heat exchanger block 2 with flat tubes which are not shown, which are each received on the longitudinal end side in passage openings 3 of associated tube plates (see FIGS. 2 to 11). The charge air cooler 1 according to FIG. 1 also comprises two collection tanks 4, 5, of which one can be formed for example as diffuser and the other one as collector. The heat exchanger block 2 is connected to a coolant system via suitable connections.

The charge air cooler 1 according to the invention has a crimping base 6 according to the invention formed as tube base, with a circumferential, raised rim 7 with crimping slots 8, which comprise two longitudinal sides 9 located opposite and run parallel to the rim 7 and two narrow sides 10, wherein the narrow sides 10 of the crimping slots 8 are stiffened by a reinforcement 11 that is formed in one piece with the rim 7 and bent. By way of the reinforcements 11 of the narrow sides 10, in particular the regions that are subjected to particularly high loads and exposed to stress peaks during the production of a crimp connection or also during operation later on can be reinforced, as a result of which the ability to withstand stress both of the crimp connection and also of a charge air cooler 1 equipped with such a crimping base 6 or a similar crimping frame, in particular also with a view to charge air pressure pulsations that occur during the operation, can be increased. The reinforcements 11 are formed in one piece with the rim 7 of the crimping base 6 or generally of a crimping frame and connected to the rim 7 via corresponding connecting webs 12 that are bent in the completed state.

Generally, protection is not only claimed with the invention for the charge air cooler 1 having such a crimping base 6, but also the crimping base 6 separately or a similarly formed crimping frame having such a rim 7 and bent reinforcements 11, which reinforce the narrow sides 10 of crimping slots 8 and thus stiffen stress-critical regions.

Here it is provided that exclusively the narrow sides 10 of the crimping slots 8 are stiffened by a reinforcement 11 that is formed in one piece with the rim 7 and bent to the outside, as a result of which a merely local stiffening is possible, which not only contributes to saving resources but additionally helps saving weight. In addition to this, a connection material, such as for example solder, is needed to a lesser degree since the stiffening 11 in the bent state abutting an outer region of the rim 7 is soldered to the rim 7 there in order to be able to reliably ensure the stiffening function.

Figure 4:
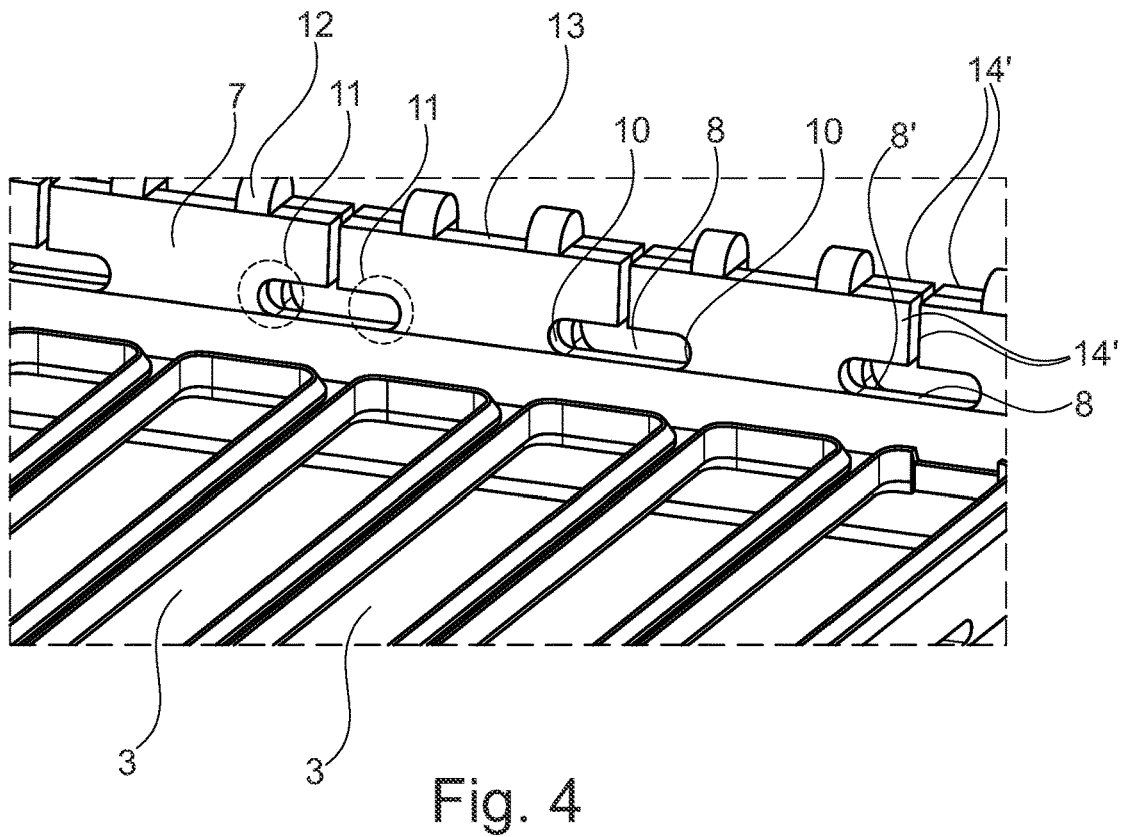
FIG. 4 shows a representation as in FIG. 3, however from inside.
Figure 5:
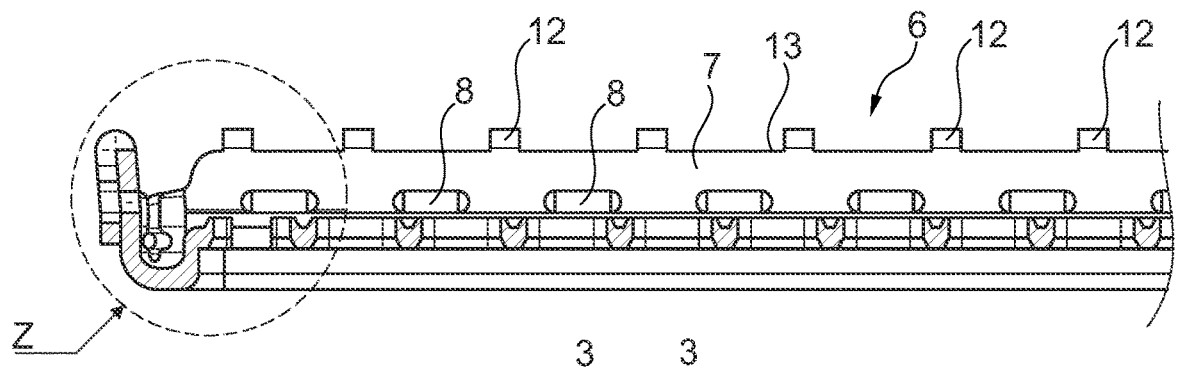
FIG. 5 shows a sectional representation through a crimping base formed as tube plate according to a second embodiment.
Figure 7:
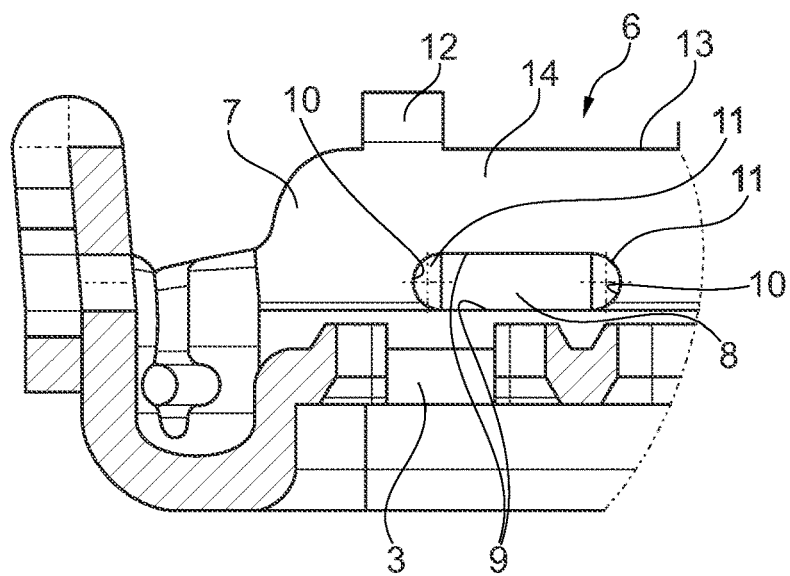
FIG. 7 shows a detail representation Z from FIG. 5.
Figure 8:
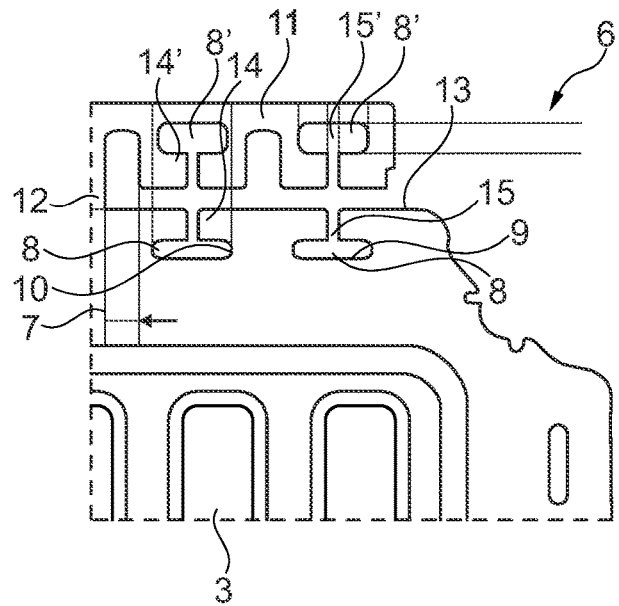
FIG. 8 shows a punching pattern for the first embodiment of the crimping base according to the invention.
Figure 9:
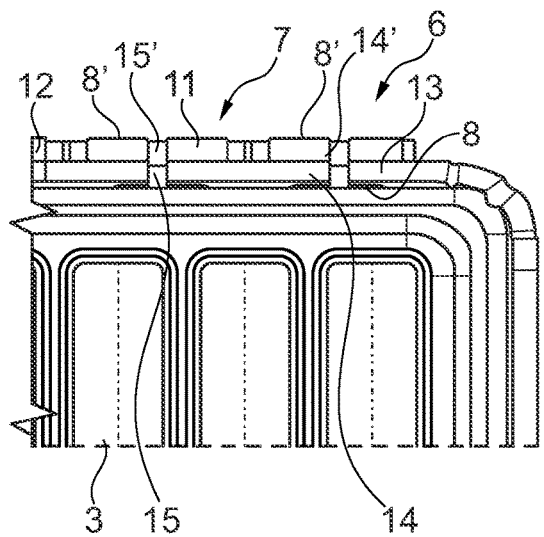
FIG. 9 shows a view from above with bent reinforcement with a punching pattern according to FIG. 8.
Figure 10:
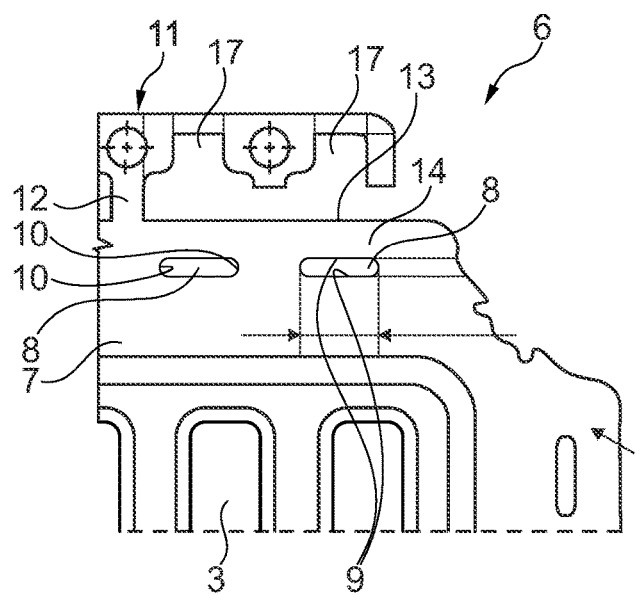
FIG. 10 shows a punching pattern for a crimping base according to the first embodiment (FIG. 2-4)

Viewing FIGS. 4, 7 as well as 8 and 10 it is noticeable that the reinforcement 11 overlaps the narrow side 10, preferentially by approximately 0.5-2 mm. The crimping slot 8' provided in the reinforcement 11 is thus shorter by approximately 1-4 mm with respect to its longitudinal extension than the crimping slot 8 in the rim 7.

Figure 2:
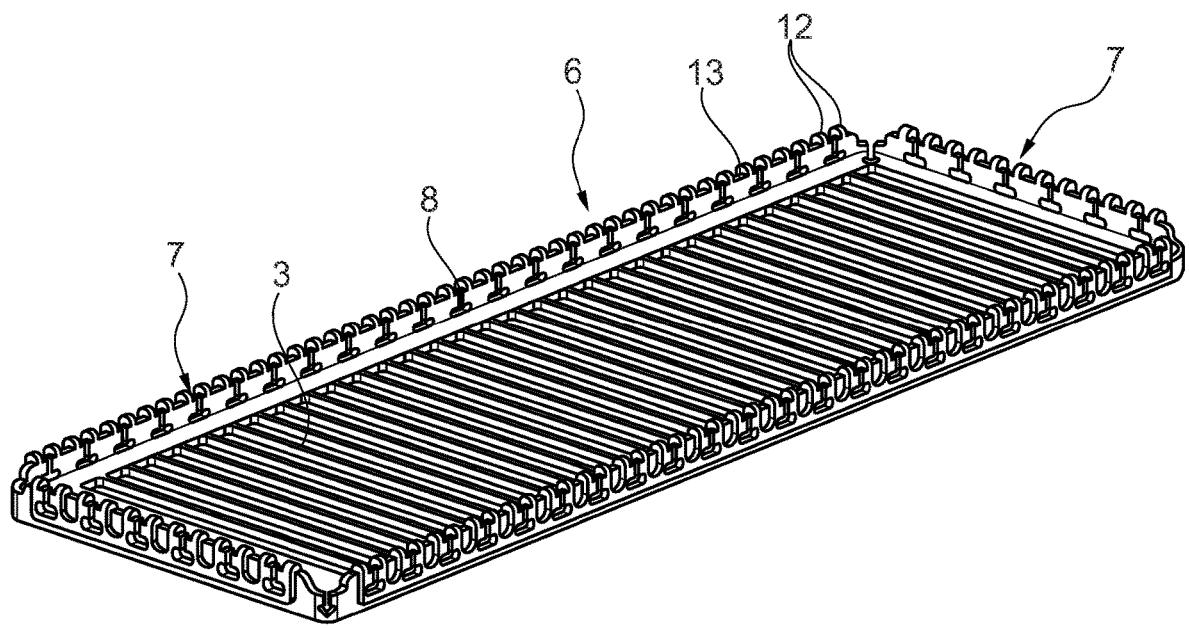
FIG. 2 shows a crimping base according to the invention in a view with a first embodiment.
Figure 3:
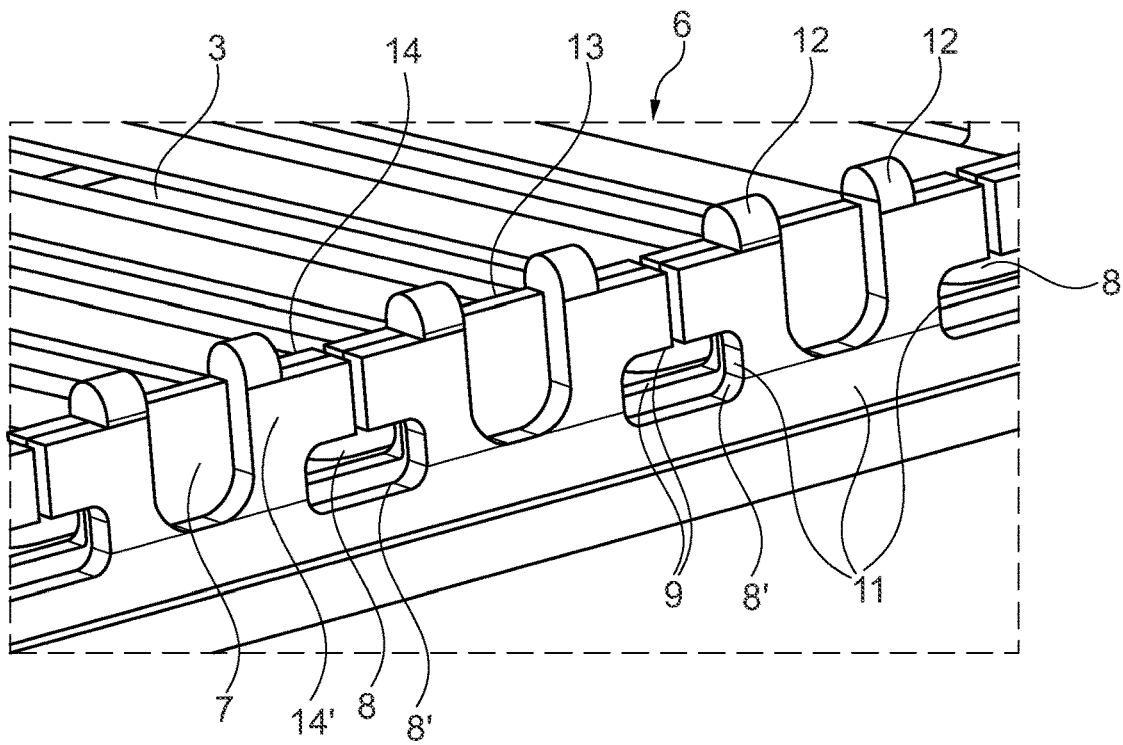
FIG. 3 shows a detail representation of a raised rim of the crimping base from FIG. 2 from the outside.

Viewing the first embodiment of the crimping base 6 according to the invention as per the representations of the FIGS. 2 to 4 as well as 8 and 9 it is noticeable that a web 14 running between the crimping clot 8 in the rim 7 and a free rim 13 is interrupted, wherein the interruption is approximately 1.5 mm wide. The crimping slot 8' in the reinforcement 11 also has such an interruption or such an interrupted web 14', wherein respective interruptions 15, 15' in the web 14, 14' with bent reinforcement 11 are arranged aligned with one another, as is easily noticeable according to the FIGS. 3, 4 and 9.

Viewing the second embodiment of the crimping base 6 according to the invention, as is shown according to the FIGS. 5 to 7 and 10 and 11, it is noticeable that the crimping slots 8 arranged in the rim 7 are closed off towards the free rim 13 by a continuous web 14. The longitudinal side 9 facing the free rim 13 or the rim 7 is thus likewise continuous, as the opposite longitudinal side 9. However, in this case, the reinforcement 11 is also formed in such a manner that in the state in which it is folded or bent and soldered to the rim 7, it exclusively stiffens the narrow sides 10 of the respective crimping slots 8, since here, through the forming operation during the crimping, during which the web or the two web halves (see FIG. 8) are formed out of the plane of the rim 7.

Figure 11:
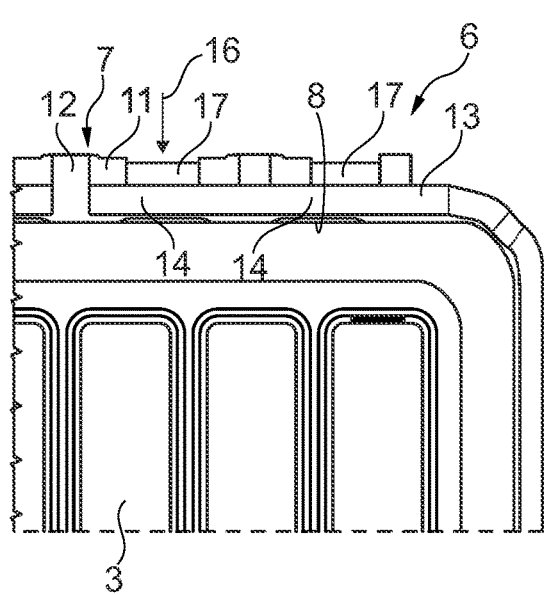
FIG. 11 shows a representation as in FIG. 9, however with the punching pattern from FIG. 10 and bent reinforcement.

A deformation of the web 14 and the rim 7 according to FIG. 11 takes place for example in the direction 16.

Figure 6:
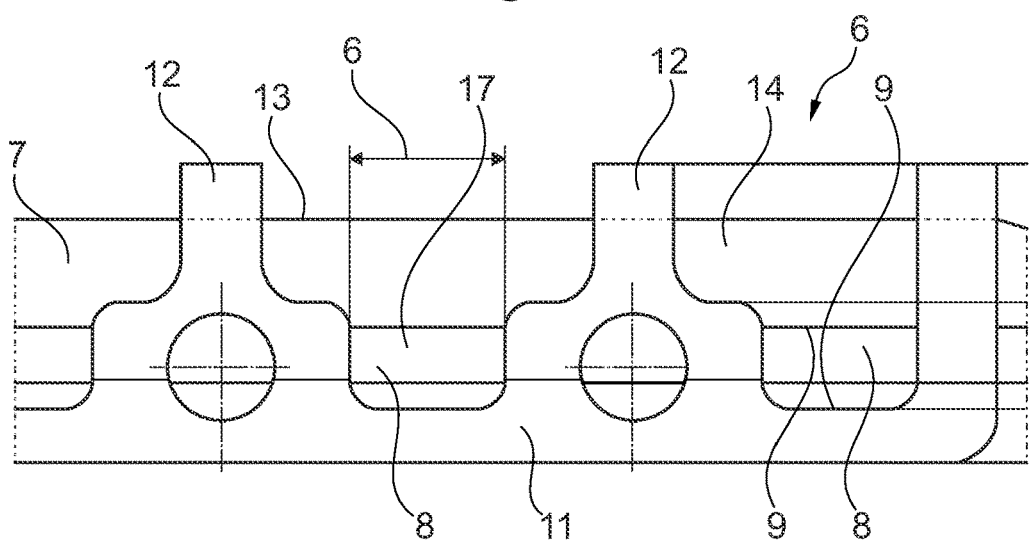
FIG. 6 shows a view from the outside of the raised rim with the reinforcement from FIG. 5.

According to FIGS. 6 and 7, it can be clearly noticed once more that the reinforcement 11 is exclusively present in the region of the narrow sides 10, i.e. locally. The crimping base 6 or the crimping frame can be formed from metal, for example from aluminium, while the collection tanks 4, 5 can be formed for example from plastic. The reinforcement 11 according to the second embodiment does not have any crimping slots 8' in the reinforcement 11 such as according to the first embodiment (compare FIGS. 8 and 9), but merely recesses 17, the width b of which is 1-4 mm shorter than the longitudinal extension of the crimping slot 8, as a result of which the reinforcement 11 overlaps the narrow sides 10 of the crimping slot 8. The narrow sides 10 of the crimping slots 8 can obviously be formed in the manner of a pitch circle and need not merge into the longitudinal sides 9 via a rectangular transition.

All in all, a significant improvement of the ability to withstand stress of a crimp connection, that is a connection of the crimping base 6 or of the crimping frame with for example a collection tank 4, 5 can be achieved with the charge air cooler 1 according to the invention or the crimping base 6 or crimping frame according to the invention, which in particular with increasingly high charge pressures in modern charge air coolers 1 is a major advantage since these then have a longer lifespan. Here it is particularly advantageous that the reinforcement 11 stiffens and reinforces the regions that are actually critical in terms of stress and load only locally, as a result of which no full-surface and thus material-intensive stiffening is present, as a result of which resources and weight can be saved. It is particularly advantageous, in addition, that a manufacturing process for producing the crimp connection need not be changed since the addition of the reinforcement 11 has no consequences to the joining process. In addition, because of the reinforcement 11 provided according to the invention on the crimping base 6 or crimping frame, further reinforcements, for example on the collection tank 4, 5 are not required.

The invention claimed is:

1. A crimping base for a charge air cooler, comprising:
   a circumferential raised rim including a plurality of crimping slots;
   the plurality of crimping slots each including two longitudinal sides and two narrow sides, the two longitudinal sides disposed opposite one another and extending parallel to the rim;
   wherein the two narrow sides are stiffened via a bent reinforcement;
   wherein the bent reinforcement and the rim are structured as a single piece; and
   wherein the bent reinforcement overlaps the two narrow sides of at least one crimping slot of the plurality of crimping slots and at least partially covers the at least one crimping slot.

2. The crimping base according to claim 1, further comprising a body structured as a shaped punched metal part.

3. The crimping base according to claim 1, wherein the bent reinforcement is connected to the rim.

4. The crimping base according to claim 1, wherein:
   the bent reinforcement extends along and reinforces an entirety of at least one of the two narrow sides; and
   the bent reinforcement does not extend along and does not reinforce a portion of at least one of the two longitudinal sides.

5. The crimping base according to claim 1, wherein the bent reinforcement overlaps the two narrow sides by approximately 0.5 mm to 2.0 mm.

6. The crimping base according to claim 1, wherein the crimping base is structured as a tube plate of the charge air cooler.

7. The crimping base according to claim 1, wherein the bent reinforcement is connected to the rim via a soldered connection.

8. The or crimping base according to claim 1, wherein:
   the bent reinforcement is structured and arranged such that (i) a material doubling is defined in a region of the two narrow sides and (ii) no material doubling is defined in at least a region of the two longitudinal sides; and
   the material doubling reinforces the two narrow sides.

9. The crimping base according to claim 1, wherein:
   the rim further includes a plurality of rim interruptions extending between an edge of the rim and the plurality of clamping slots; and
   the bent reinforcement includes a plurality of reinforcement interruptions disposed in alignment with the plurality of rim interruptions.

10. The crimping base according to claim 1, further comprising a plurality of bent connecting webs extending between and connecting the rim and the bent reinforcement, and wherein the plurality of bent connecting webs are each arranged in a region of an associated narrow side of the plurality of crimping slots.

11. The crimping base according to claim 1, further comprising a plurality of bent connecting webs extending between and connecting the rim and the bent reinforcement, and wherein one of the plurality of bent connecting webs is arranged between each pair of adjacent crimping slots of the plurality of crimping slots.

12. The crimping base according to claim 1, wherein:
the bent reinforcement includes a plurality of recesses that are each aligned with a corresponding crimping slot of the plurality of crimping slots; and
a shape of at least one of the plurality of recesses is different than a shape of the corresponding crimping slot.

13. The crimping base according to claim 1, wherein:
the bent reinforcement includes a plurality of recesses that are each aligned with a corresponding crimping slot of the plurality of crimping slots; and
a size of at least one of the plurality of recesses is different than a size of the corresponding crimping slot.

14. The crimping base according to claim 1, wherein:
the bent reinforcement includes a plurality of recesses that are each aligned with a corresponding crimping slot of the plurality of crimping slots;
the plurality of recesses each have an open end, two narrow sides, and a longitudinal side extending between the two narrow sides and disposed opposite the open end;
the open end of at least one recess of the plurality of recesses is disposed proximal a first longitudinal side of the two longitudinal sides of the corresponding crimping slot; and
the longitudinal side of the at least one recess is disposed proximal and spaced apart from a second longitudinal side of the two longitudinal sides of the corresponding crimping slot.

15. The crimping base according to claim 1, wherein:
the main portion and the reinforcement portion abut one another, at least in regions, to define a plurality of material doubling regions;
at least one of the plurality of material doubling regions is disposed along and reinforces at least one of the two narrow sides of at least one crimping slot of the plurality of crimping slots; and
the plurality of material doubling regions are not disposed along a portion of each of the two longitudinal sides of the at least one crimping slot.

16. A charge air cooler, comprising:
a heat exchanger block including a plurality of flat tubes each received, on a respective longitudinal end side, in a plurality of passage openings of at least one associated tube plate of a plurality of tube plates;
a collection tank;
at least one tube plate of the plurality of tube plates structured as a crimping base;
the crimping base including a circumferential raised rim having a plurality of crimping slots;
the plurality of crimping slots each including two longitudinal sides and two narrow sides, the two longitudinal sides disposed opposite one another and extending parallel to the rim;
wherein the two narrow sides are stiffened via a bent reinforcement;
wherein the bent reinforcement and the rim are structured as a single piece;
wherein the crimping base is crimped to a rim of the collection tank;
wherein the bent reinforcement includes a plurality of recesses that are each aligned with a corresponding crimping slot of the plurality of crimping slots; and
wherein at least one of:
a shape of at least one of the plurality of recesses is different than a shape of the corresponding crimping slot; and
a size of at least one of the plurality of recesses is different than a size of the corresponding crimping slot.

17. The charge air cooler according to claim 16, wherein:
the bent reinforcement extends along and reinforces an entirety of at least one of the two narrow sides; and
the bent reinforcement does not extend along and does not reinforce a portion of at least one of the two longitudinal sides.

18. The charge air cooler according to claim 17, wherein the bent reinforcement overlaps the two narrow sides of at least one crimping slot of the plurality of crimping slots by approximately 0.5 mm to 2.0 mm and at least partially covers the at least one crimping slot.

19. A crimping base for a charge air cooler, comprising:
a circumferential raised rim including a main portion, a reinforcement portion, and at least one bent connecting web extending between and connecting the main portion and the reinforcement portion;
a plurality of crimping slots disposed in the main portion of the rim, the plurality of crimping slots each including two longitudinal sides and two narrow sides, the two longitudinal sides disposed opposite one another and extending parallel to the rim;
wherein the main portion, the reinforcement portion, and the at least one bent connecting web are structured as a single piece and the at least one bent connecting web is bent such that the reinforcement portion is folded over onto the main portion;
wherein the main portion and the reinforcement portion abut one another, at least in regions, to define a plurality of material doubling regions;
wherein at least one of the plurality of material doubling regions is disposed along and reinforces at least one of the two narrow sides of at least one crimping slot of the plurality of crimping slots; and
wherein the plurality of material doubling regions are not disposed along a portion of each of the two longitudinal sides of the at least one crimping slot.

20. The crimping base according to claim 19, wherein the bent reinforcement overlaps at least one of the two narrow sides of the at least one crimping slot and at least partially covers the at least one crimping slot.

* * * * *